(No Model.)

G. VAN NORMANN.
FISH HOOK.

No. 345,088. Patented July 6, 1886.

Witnesses
T. S. Merwin
Richard Oul

Inventor
Gustaf van Normann,
By A. C. Paul,
Atty.

UNITED STATES PATENT OFFICE.

GUSTAF VAN NORMANN, OF MINNEAPOLIS, MINNESOTA, ASSIGNOR TO MINNA M. VAN NORMANN, OF SAME PLACE.

FISH-HOOK.

SPECIFICATION forming part of Letters Patent No. 345,088, dated July 6, 1886.

Application filed April 23, 1886. Serial No. 199,912. (No model.)

*To all whom it may concern:*

Be it known that I, GUSTAF VAN NORMANN, of Minneapolis, Hennepin county, Minnesota, have invented certain Improvements in Fish-Hooks, of which the following is a specification.

The object I have in view is to provide a fish-hook designed especially for trolling, which shall not be liable to catch on grass, weeds, or other obstructions.

The invention consists, generally, in the construction and combination hereinafter described, and particularly pointed out in the claims.

Figure 1:
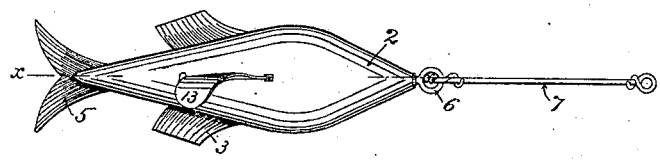
Figure 2:
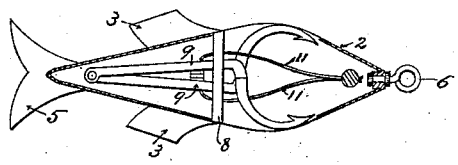
Figure 3:
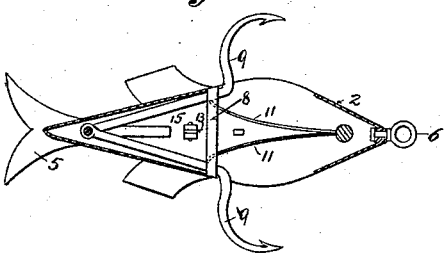
Figure 4:
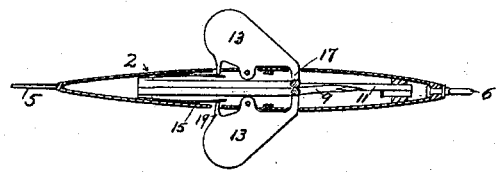

In the drawings forming part of this specification, Figure 1 is a side elevation of my improved hook. Fig. 2 is a longitudinal section of the same. Fig. 3 is a similar view with the hooks opened. Fig. 4 is a longitudinal section on line $x\,x$, Fig. 1.

In the drawings, 2 represents a suitable casing or shell, which is made, preferably, of light metal and in the shape of a small fish. The shell is preferably provided with the fins 3 3, and tail 5. The forward end of the shell is preferably provided with a swivel, 6, to which a wire may be secured. Within the shell are the pivoted hooks 9, that are arranged to be wholly inclosed by the shell or to project through openings in the walls thereof. The hooks are provided with suitable springs, 11, that tend to project the hooks through the casing, as shown in Fig. 3. Plates 13 are pivoted to the shell upon opposite sides thereof, and are suitably curved, so as to give the hook a whirling motion as it is drawn through the water. These plates are provided with the forward projections or lugs, 17, and the rear projections, 19. The projections 19 bear upon springs 15, which tend to throw these ends of the plates outward and the other ends with the lugs 17 inward. When the hooks are retracted, as shown in Fig. 4, they are engaged by the lugs 17, which hold them in place. While the hooks are in this position they are entirely concealed, and when the lugs 17 are forced inward by the springs one of them passes in front of one hook, and the other in front of the other hook, and thereby they prevent the hook from springing out. They cannot catch onto any grass, &c., that may be in the water through which the device is drawn. The plates 13 cause the device to whirl as it is drawn through the water. The broadest portions of the plates 13 are in the rear of their pivots, so that any pressure on the edges of the plates forces the projections 19 inward and draws the lugs 17 outward, thereby releasing the hooks, which are instantly thrown outward by the springs. As this device is drawn through the water, it will be grasped by the fish, and the holding-plates 13 will be moved to release the hooks, which, springing outward, will hook the fish.

The device is very simple and inexpensive, and overcomes the serious objection to the usual hooks owing to their liability to catch on obstructions as they are drawn through the water. A metal strap, 8, preferably passes around inside the shell and embraces the hooks, so as to prevent the shell being broken by a strain upon the hooks.

I claim as my invention—

1. The combination, with the shell, of the spring-operated hooks 9 inclosed therein, the holding-plates 13, and springs 15, all substantially as described.

2. The combination, with the shell, of the pivoted hooks arranged therein, the springs 11, bearing on said hooks, the curved plates 13, pivoted to the shell and having the lugs 17, and projections 19, and the springs 15, all substantially as described, and for the purpose set forth.

In testimony whereof I have hereunto set my hand this 15th day of April, 1886.

GUSTAF VAN NORMANN.

In presence of—
A. C. PAUL,
RICHARD PAUL.